United States Patent
Hull et al.

(10) Patent No.: US 7,424,974 B2
(45) Date of Patent: Sep. 16, 2008

(54) TECHNIQUES THAT FACILITATE TRACKING OF PHYSICAL LOCATIONS OF PAPER DOCUMENTS

(75) Inventors: Jonathan J. Hull, San Carlos, CA (US); Jamey Graham, San Jose, CA (US); Dar-Shyang Lee, Union City, CA (US)

(73) Assignee: Ricoh Company, Ltd. (JP)

( * ) Notice: Subject to any disclaimer, the term of this patent is extended or adjusted under 35 U.S.C. 154(b) by 910 days.

(21) Appl. No.: 10/235,035

(22) Filed: Sep. 3, 2002

(65) Prior Publication Data

US 2005/0105724 A1    May 19, 2005

(51) Int. Cl.
    *G06F 19/00*    (2006.01)
(52) U.S. Cl. .................. 235/385; 235/375; 235/382; 382/110; 382/112
(58) Field of Classification Search ................ 235/385, 235/375, 382; 382/110, 112; 340/10.1
    See application file for complete search history.

(56) References Cited

U.S. PATENT DOCUMENTS

| | | | |
|---|---|---|---|
| 4,862,160 A | 8/1989 | Ekchian et al. | |
| 5,287,414 A | 2/1994 | Foster | |
| 5,666,490 A | 9/1997 | Gillings et al. | |
| 5,689,238 A | 11/1997 | Cannon, Jr. et al. | |
| 5,706,452 A | 1/1998 | Ivanov | |
| 5,732,401 A * | 3/1998 | Conway ...................... | 705/29 |
| 5,926,116 A | 7/1999 | Kitano et al. | |
| 5,933,829 A | 8/1999 | Durst et al. | |
| 5,936,527 A | 8/1999 | Isaacman et al. | |
| 5,939,981 A | 8/1999 | Renney | |
| 5,974,202 A | 10/1999 | Wang et al. | |
| 5,978,477 A | 11/1999 | Hull et al. | |
| 5,978,773 A | 11/1999 | Hudetz et al. | |
| 6,008,727 A | 12/1999 | Want et al. | |
| 6,055,544 A | 4/2000 | DeRose et al. | |

(Continued)

FOREIGN PATENT DOCUMENTS

| | | |
|---|---|---|
| CA | 2354464 | 7/2003 |
| DE | 19646153 A1 | 5/1998 |
| EP | 794 507 B1 | 4/2004 |
| FR | 2782703 A1 | 3/2000 |
| JP | 08-101980 | 4/1996 |
| JP | 2002-522999 | 7/2002 |
| JP | 2002337426 | 11/2002 |
| WO | WO 00/26856 A2 | 5/2000 |

OTHER PUBLICATIONS

"Workflow Management Coalition Workflow Standard-Interoperability Wf-XML Binding," The Workflow Management Coalition Specification, May 1, 2000, Version 1.0, Copyright 1999, 2000 The Workflow Management Coalition, pp. 4-40 (2000).

(Continued)

*Primary Examiner*—Michael G. Lee
*Assistant Examiner*—Allyson N Trail
(74) *Attorney, Agent, or Firm*—Townsend and Townsend and Crew LLP (57) ABSTRACT

Techniques that facilitate tracking of physical locations of paper documents. Embodiments of the present invention can track physical locations of paper documents that have identification tags physically associated with them. Each identification tag that is physically associated with a paper document is configured to store information that can be used to uniquely identify the paper document with which the identification tag is physically associated. For a particular paper document, the identification tag physically associated with the particular paper document along with information stored in the identification tag facilitates tracking of the physical location of the particular paper document.

58 Claims, 4 Drawing Sheets

U.S. PATENT DOCUMENTS

| | | | |
|---|---|---|---|
| 6,100,804 | A | 8/2000 | Brady et al. |
| 6,104,834 | A | 8/2000 | Hull |
| 6,108,656 | A | 8/2000 | Durst et al. |
| 6,122,520 | A | 9/2000 | Want et al. |
| 6,127,928 | A | 10/2000 | Isaacman et al. |
| 6,130,621 | A | 10/2000 | Weiss |
| 6,176,425 | B1 | 1/2001 | Harrison et al. |
| 6,195,006 | B1 | 2/2001 | Bowers |
| 6,199,048 | B1 | 3/2001 | Hudetz et al. |
| 6,204,764 | B1 | 3/2001 | Maloney |
| 6,232,870 | B1 | 5/2001 | Garber et al. |
| 6,249,226 | B1 | 6/2001 | Harrison et al. |
| 6,259,367 | B1 | 7/2001 | Klein |
| 6,260,049 | B1 | 7/2001 | Fitzgerald et al. |
| 6,262,662 | B1 | 7/2001 | Back et al. |
| 6,278,413 | B1 | 8/2001 | Hugh et al. |
| 6,294,998 | B1 | 9/2001 | Adams et al. |
| 6,297,737 | B1 | 10/2001 | Irvin |
| 6,304,182 | B1 | 10/2001 | Mori et al. |
| 6,307,473 | B1 | 10/2001 | Zampini et al. |
| 6,324,353 | B1 | 11/2001 | Laussermair et al. |
| 6,326,889 | B1 | 12/2001 | Van Horn et al. |
| 6,333,690 | B1 | 12/2001 | Nelson et al. |
| 6,335,685 | B1 | 1/2002 | Schrott et al. |
| 6,337,619 | B1 | 1/2002 | Kowalski et al. |
| 6,340,931 | B1 | 1/2002 | Harrison et al. |
| 6,341,931 | B1 | 1/2002 | Bates |
| 6,354,493 | B1 | 3/2002 | Mon |
| 6,359,628 | B1 | 3/2002 | Buytaert |
| 6,380,894 | B1 | 4/2002 | Boyd et al. |
| 6,427,032 | B1 | 7/2002 | Irons et al. |
| 6,430,554 | B1 | 8/2002 | Rothschild |
| 6,434,561 | B1 | 8/2002 | Durst, Jr. et al. |
| 6,442,563 | B1 | 8/2002 | Bacon et al. |
| 6,512,919 | B2 | 1/2003 | Ogasawara |
| 6,542,933 | B1 | 4/2003 | Durst, Jr. et al. |
| 6,651,053 | B1 | 11/2003 | Rothschild |
| 6,651,063 | B1 | 11/2003 | Vorobiev |
| 6,655,586 | B1 * | 12/2003 | Back et al. .................. 235/382 |
| 6,675,165 | B1 | 1/2004 | Rothschild |
| 6,707,381 | B1 | 3/2004 | Maloney |
| 6,766,363 | B1 | 7/2004 | Rothschild |
| 6,801,907 | B1 * | 10/2004 | Zagami ......................... 707/3 |
| 6,825,753 | B2 | 11/2004 | Cardinale et al. |
| 6,860,422 | B2 | 3/2005 | Hull et al. |
| 6,865,608 | B2 | 3/2005 | Hunter |
| 6,892,376 | B2 | 5/2005 | McDonald et al. |
| 6,993,573 | B2 | 1/2006 | Hunter |
| 7,006,664 | B2 * | 2/2006 | Paraskevakos .............. 382/100 |
| 2002/0032698 | A1 | 3/2002 | Cox |
| 2002/0032707 | A1 | 3/2002 | Takeoka |
| 2002/0113707 | A1 | 8/2002 | Grunes et al. |
| 2002/0176116 | A1 | 11/2002 | Rhoads et al. |
| 2003/0018669 | A1 | 1/2003 | Kraft |
| 2003/0102970 | A1 | 6/2003 | Creel et al. |
| 2003/0179908 | A1 * | 9/2003 | Mahoney et al. ............ 382/112 |
| 2003/0191719 | A1 | 10/2003 | Ginter et al. |
| 2003/0214388 | A1 * | 11/2003 | Stuart et al. ................ 340/10.1 |
| 2004/0017313 | A1 | 1/2004 | Menache |
| 2004/0041696 | A1 | 3/2004 | Hull et al. |
| 2004/0041707 | A1 | 3/2004 | Hull et al. |
| 2004/0044956 | A1 | 3/2004 | Huang |
| 2004/0078749 | A1 | 4/2004 | Hull et al. |
| 2004/0079796 | A1 | 4/2004 | Hull et al. |
| 2004/0181756 | A1 | 9/2004 | Berringer et al. |
| 2004/0205455 | A1 | 10/2004 | Dathathraya |
| 2004/0257231 | A1 * | 12/2004 | Grunes et al. ............... 235/375 |
| 2005/0035862 | A1 | 2/2005 | Wildman et al. |
| 2005/0182757 | A1 | 8/2005 | Hull et al. |

OTHER PUBLICATIONS

"Hitachi Announces world's smallest RFID IC, the 'mu-chip,'" company press release, Hitachi Ltd. Tokyo, Japan (Jul. 5, 2001).

Allen "Workflow: An Introduction," pp. 15-38 from *The Workflow Handbook 2001*, L. Fischer eds., published Oct. 20, 2000.

Kwon "Tiny Bay Area Invention Could Change Security," on-line article available at http://www.kpix.com, KPIX Channel 5, San Francisco, CA 94111-1597 (Dec. 3, 2001).

Want et al. "Bridging Physical and Virtual Worlds with Electronic Tags," In Proc. ACM CHI '99 pp. 370-377 (May 15-20, 2001).

Want et al. "Expanding the Horizons of Location-Aware Computing," IEEE Computer 34:31-34 (Aug. 2001).

Want et al. "Ubiquitous Electronic Tagging," IEEE Distributed Systems Online 1:1-6 (Dec. 1999).

Web pages from PaperClick.com printed from http://www.paperclick.com on Jun. 14, 2006.

WC3®, "URIs, URLs, and URNs: Clarifications and Recommendations 1.0, Report from the joint W3C/IETF URI Planning Interest Group," downloaded from http://www.w3.org/TR/uri-clarification/ on Jun. 9, 2005.

Communication of Sep. 4, 2007 from European Patent Office with Examination Report for related European application No. 03018768.6-2206.

* cited by examiner

Fig. 4

TECHNIQUES THAT FACILITATE TRACKING OF PHYSICAL LOCATIONS OF PAPER DOCUMENTS

CROSS-REFERENCES TO RELATED APPLICATIONS

This application incorporates by reference the entire contents of the following applications and patents for all purposes:

(1) U.S. patent application Ser. No. 08/754,721, filed Nov. 21, 1996 which issued as U.S. Pat. No. 5,978,477;

(2) U.S. patent application Ser. No. 10/235,042 filed concurrently with this application;

(3) U.S. patent application Ser. No. 10/235,032 filed concurrently with this application;

(4) U.S. patent application Ser. No. 10/235,028 filed concurrently with this application;

(5) U.S. patent application Ser. No. 10/235,030 filed concurrently with this application; and (6) U.S. patent application Ser. No. 10/234,414 filed concurrently with this application and which issued as U.S. Pat. No. 6,860,422.

BACKGROUND OF THE INVENTION

The present invention relates generally to the field of document processing, and more particularly to techniques that facilitate tracking of physical locations of one or more paper documents.

The tracking of physical objects is a problem that has plagued mankind since the beginning of mankind. Ever since the first cave boy said to his mother "Mom, where's my club?" there has been a need for a solution to the inevitable answer—"It's right where you left it."

The problem is particularly acute for people who have to deal with paper documents. The proliferation of paper document output devices such as copiers, printers, and facsimile machines, has greatly increased the number of paper documents used in commercial and non-commercial settings. Most office users have had the experience of looking through filing cabinets and bookshelves or rummaging through stacks of paper documents to find a particular paper document. As a result, the ability to track physical locations of paper documents is of great importance, especially in an office environment.

In light of the above, there is a need for techniques that facilitate tracking of physical locations of one or more paper documents.

BRIEF SUMMARY OF THE INVENTION

Embodiments of the present invention provide techniques that facilitate tracking of physical locations of paper documents. Embodiments of the present invention can track physical locations of paper documents that have identification tags physically associated with them. Each identification tag that is physically associated with a paper document is configured to store information that can be used to uniquely identify the paper document with which the identification tag is physically associated. For a particular paper document, the identification tag physically associated with the particular paper document along with information stored in the identification tag facilitates tracking of the physical location of the particular paper document.

According to an embodiment of the present invention, techniques are provided for storing information that enables tracking of physical locations of paper documents. In this embodiment, a paper document is generated using a paper document output device, wherein an identification tag is physically associated with the paper document. Identification information stored by the identification tag is determined. The identification information determined from the identification tag is used to identify the paper document. The identification information is stored along with physical location information identifying a physical location of the paper document. The information is stored such that the physical location information is associated with the stored identification information.

The foregoing, together with other features, embodiments, and advantages of the present invention, will become more apparent when referring to the following specification, claims, and accompanying drawings.

DETAILED DESCRIPTION OF THE INVENTION

Embodiments of the present invention provide techniques that facilitate tracking of physical locations of paper documents. For purposes of this invention, the term "paper document" is intended to refer to a document comprising one or more pages of any tangible medium on which information can be printed, written, drawn, imprinted, embossed, etc. For example, a paper document may refer to a document printed by a printer, a document output by a copier or scanner, a document output by a facsimile machine, a photograph, a book, a single page of paper, a document comprising a plurality of papers, and the like. In alternative embodiments, the teachings of the present invention may also be applied to other types of objects besides paper documents.

For purposes of this invention, the term "electronic document" is intended to refer to information stored in an electronic or digital form. Examples of electronic documents include files, documents created using application programs such as word processors, email programs, image editors, etc., scanned images of paper documents, documents stored in various formats such as PDF, Postscript, etc., and other types of documents stored in electronic form.

Embodiments of the present invention can track physical locations of paper documents that have identification tags physically associated with them. Each identification tag that is physically associated with a paper document is configured to store information that can be used to uniquely identify the paper document with which the identification tag is physically associated. For a particular paper document, the identification tag physically associated with the particular paper document along with information stored in the identification tag facilitates tracking of the physical location of the particular paper document.

As described above, each identification tag that is physically associated with a paper document stored information can be used to uniquely identify the paper document with which the identification tag is physically associated. The information stored in the identification tag may be of various types. According to an embodiment of the present invention, a unique identification code is stored in an identification tag. In this embodiment, the unique identification code is used to identify the paper document with which the identification tag is physically associated. It should be understood that other types of information that can be used to identity documents might also be stored in an identification tag in alternative embodiments of the present invention.

In addition to information that is used to identify a paper document, other information related to the paper document may also be stored in an identification tag that is physically associated with the paper document. For example, according to an embodiment of the present invention, an electronic representation of the contents of the paper document (e.g., a scanned image of the paper document, a Postscript format file or Portable Document Format (PDF) or image format or other format file used for generating the paper document, electronic contents of the paper document or portions thereof, etc.) may be stored in an identification tag physically associated with the paper document. Other types of information such as information identifying the author of the paper document, the date when the paper document was created, the number of pages in the paper document, and other like information may also be stored in the identification tag that is physically associated with the paper document. Other types of information that can be stored in an identification tag is described in U.S. patent application Ser. No. 10/235,042, U.S. patent application Ser. No. 10/235,032, U.S. patent application Ser. No. 10/235,028, U.S. patent application Ser. No. 10/235,030, and U.S. patent application Ser. No. 10/234,414, the entire disclosures of which are herein incorporated by reference for all purposes.

Various devices known to those skilled in the art may be used as identification tags. According to an embodiment of the present invention, an identification tag device includes an on-device memory that is capable of storing information related to the paper document with which the identification tag is physically associated. Depending upon the type of identification tag used, the information (e.g., identification code information, and other information) may be stored in the memory of the identification tag when the tag is manufactured, when the tag is activated, or at some later time using software or hardware techniques. Various tag readers may be configured to read the information stored by the identification tag.

According to an embodiment of the present invention, in order to track the physical location of a paper document, a tag reader is configured to read the information stored in the identification tag that is physically associated with the paper document. A tag reader may use various different techniques to read information from an identification tag. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

According to an embodiment of the present invention, radio frequency identification devices (RFIDs) are used as identification tags. For example, the Mu-chip manufactured by Hitachi, Ltd. may be used as an identification tag. The Mu-chip is a radio recognition IC chip that measures 0.4-mm square and is 60 microns thick in its present embodiment. Due to its reduced size, the Mu-chip can be embedded into paper. The Mu-chip comprises an on-chip memory (presently a 128-bit ROM) that can be programmed to store information (e.g., an identification code) that can be used to identify a paper document. In its present embodiment, a tag reader can read information stored by a Mu-chip by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader.

Various different techniques may be used to physically associate an identification tag with a paper document. According to one technique, depending on the size of the identification tag, the identification tag is embedded in a page of the paper document. For example, a Mu-chip, due to its reduced size, can be embedded in a page of the paper document. A paper page that has an identification tag embedded in it may be referred to as "tagged paper". In this embodiment, a paper document may include at least one page that has an identification tag embedded in it. According to an embodiment of the present invention, if the paper document output device has access to tagged paper, the paper document output device may use one or more of the tagged papers to generate the paper document.

The identification tag may also be permanently or temporarily attached to a paper document. The tag may be attached to the paper document using clips, staples, adhesives, ties, strings, rubber bands, labels with identification tags, and the like. An identification tag may also be incorporated into an object such as a label, a staple, etc. that is attached to the paper document.

According to an embodiment of the present invention, an identification tag is physically associated with a paper document at the time the paper document is generated or produced. A device that generates or produces a paper document may be referred to as a "paper document output device". Accordingly, in one embodiment of the present invention, the identification tag is physically associated with a paper document by the paper document output device that is used to produce or generate the paper document. Examples of paper document output devices include printers, scanners, copiers, facsimile machines, cameras that are capable of printing photos, and the like.

For example, according to an embodiment of the present invention, a copier may be configured to physically associate an identification tag with a photocopy paper document produced by the copier. Likewise, a printer may be configured to physically associate an identification tag with a paper document printed by the printer. A facsimile machine may be configured to physically associate an identification tag with a paper document facsimile output. Likewise, other paper document output devices may be configured to physically associate identification tags with paper documents when the paper document output devices generate the paper documents.

According to an embodiment of the present invention, a paper document output device is configured to automatically physically associate an identification tag with a paper document generated by the paper document output device when the paper document output device produces the paper document. For example, if the paper document output device has access to tagged paper, the paper document output device may automatically use one or more of the tagged papers to generate the paper document. In other embodiments, the paper document output device may be configured to dispense an identification tag that can be attached to a paper document produced by the paper document output device. The paper document output device may dispense the identification tag when the paper document output device generates the paper document. For example, the paper document output device may output a label with an identification tag affixed on it and request a user of the paper document output device to attach the dispensed label to the paper document generated by the paper document output device.

In addition to physically associating an identification tag with a paper document, for each identification tag that is physically associated with a paper document generated by a paper document output device, the paper document output device may also be configured to read information stored on the identification tag. For example, the paper document output device may be configured to read the identification code information from an identification tag that is physically associated with a paper document generated by the paper document output device. The paper document output device may then store the identification code information read from the paper document.

According to an embodiment of the present invention, the identification code information read from an identification tag physically associated with a paper document is used to uniquely identify the paper document and may be stored by paper document output device. For example, the identification code information may be stored in a database ("paper document tracking database") accessible to the paper document output device.

According to an embodiment of the present invention, along with the identification codes, information identifying physical locations of paper documents corresponding to the identification codes is also stored. For example, for each identification code stored, information identifying the physical location of the paper document identified by the identification code is also stored. The physical location information for a document identified by an identification code is associated with the identification code information for the document. The information is stored in a manner such that the physical location information for a particular document can be determined based upon the identification code for the particular document. According to an embodiment of the present invention, the identification code and the physical locations information are stored in the paper document tracking database.

When a paper document output device generates a paper document, the physical location of the paper document is the same as the physical location of the paper document output device itself. For example, when a copier generates a photocopy, the photocopy is generally located on an output tray of the copier. As a result, when a paper document is generated by a paper document output device, the identification code read from the identification tag physically associated with the paper document is stored and the physical location information associated with the stored identification code is initialized to the physical location of the paper document output device. As indicated above, according to an embodiment of the present invention, the paper document output device may store the identification code information and the physical location information in the paper document tracking database.

For each identification code stored in the paper document tracking database, other information related to the paper document identified by the identification code may also be stored in the paper document tracking database. According to an embodiment of the present invention, electronic information representative of the paper document may also be stored in the paper document tracking database and associated with the identification code identifying the paper document. For example, a scanned image of the paper document, an electronic format (e.g., Postscript format, PDF format, image format, etc.) that is received by the paper document output device and used to generate the paper document, etc. may be stored in the paper document tracking database.

For example, for a paper document generated by a printer, the printer may be configured to store the following information in the paper document tracking database: the identification code information read from an identification tag physically associated with the paper document printed by the printer, information identifying the physical location of the printer, and electronic format (e.g., Postscript file, PDF file, image format, etc.) received and used by the printer to generate the printout.

For a photocopy paper document generated by a copier or scanner from an original paper document, the copier or scanner may be configured to store the following information in the paper document tracking database: the identification code information read from an identification tag physically associated with the photocopy paper document generated by the copier, information identifying the physical location of the copier, and a scanned image of the original paper document that is used by the copier to generate the photocopy.

For a facsimile output generated by a facsimile machine, the facsimile machine may be configured to store the following information in the paper document tracking database: the identification code information read from an identification tag physically associated with the facsimile output, information identifying the physical location of the facsimile machine, and electronic information that is used by the facsimile machine to generate the facsimile output.

According to the teachings of the present invention, the physical location information corresponding to an identification code and stored in the paper document tracking database is updated as the physical location of the paper document identified by the identification code changes. As described below, a network of tag readers is used to determine the physical location of the paper document and to appropriately update the physical location information associated with the identification code identifying the document.

As indicated above, the identification code information and the physical location information for paper documents may be stored in a paper document tracking database. The paper document output device or some other data processing system may store the paper document tracking database. If the information is stored by a system other than the paper document output device, the paper document output device may be configured to forward the information to the other system.

It should be understood that various different techniques known to those skilled in the art might be used for storing identification codes information, physical locations information, and other information described above. For example, in alternative embodiments, the information may be stored in a file, in one or more data structures, and the like.

Figure 1:
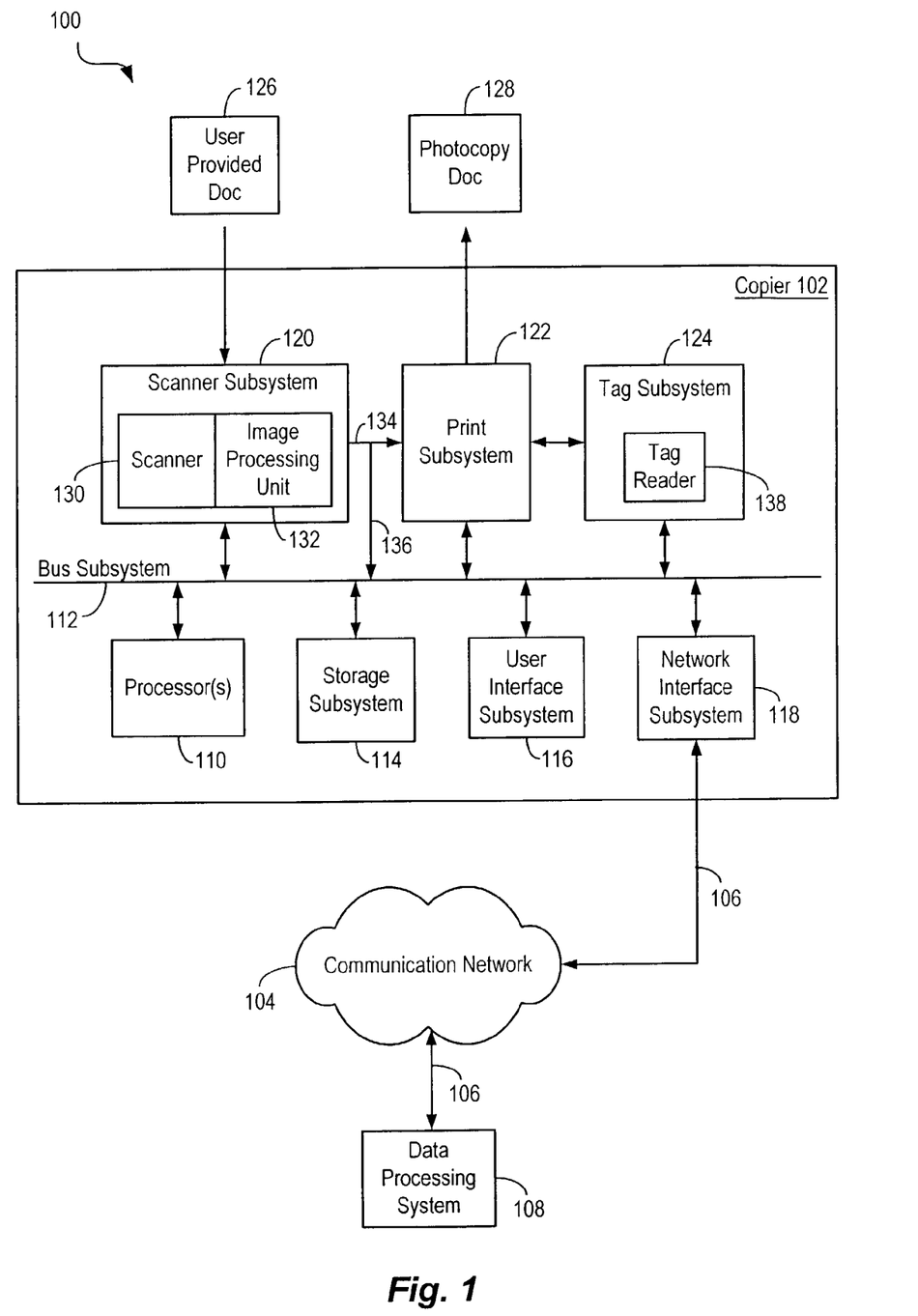
FIG. 1 is a simplified block diagram of a network environment comprising a copier that is configured to generate paper documents according to an embodiment of the present invention.

As stated above, the paper document output device may be embodied as a copier. In accordance with the teachings of the present invention, the copier may be configured to physically associate an identification tag with a paper document generated by the copier and to facilitate storage of identification code information read from identification tags physically associated with the paper document generated by the copier. FIG. 1 is a simplified block diagram of a network environment 100 comprising a copier 102 that is configured to generate paper documents according to an embodiment of the present invention. As depicted in FIG. 1, copier 102 is coupled to network 104 via communication link 106. Copier 102 is configured to accept a document 126 (also referred to as the "user-provided document") and print a copy 128 (or photocopy) of document 126. Document 128 thus represents the paper document generated by copier 102. The user-provided document may be a single or multi-page document. Photocopy document 128 may also be a single or a multi-page document. A data processing system 108 may be also be coupled to network 104 via communication link 106. Network environment 100 depicted in FIG. 1 is merely illustrative of an environment incorporating the present invention and does not limit the scope of the invention as recited in the claims. One of ordinary skill in the art would recognize other variations, modifications, and alternatives.

Communication network 104 depicted in FIG. 1 provides a mechanism for allowing communication and exchange of data and information between data processing system 108 and copier 102. Communication network 104 may itself be comprised of many interconnected computer systems and communication links. Communication network 104 may be embodied as a direct connection, a LAN, a wide area network (WAN), a wireless network, an Intranet, the Internet, a private network, a public network, a switched network, or any other suitable communication network.

Communication links 106 that are used to connect the various systems depicted in FIG. 1 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

As shown in FIG. 1, copier 102 includes a processor 110 that communicates with a number of peripheral subsystems via a bus subsystem 112. These peripheral subsystems may include a storage subsystem 114, a user interface subsystem 116, a network interface subsystem 118, a scanner subsystem 120, a print subsystem 122, and a tag subsystem 124.

Bus subsystem 112 provides a mechanism for letting the various components and subsystems of copier 102 communicate with each other as intended. Although bus subsystem 112 is shown schematically as a single bus, alternative embodiments of the bus subsystem may utilize multiple buses.

User interface subsystem 116 allows user interaction with copier 102. A user may be a human user, a device, a process, another computer, and the like. User interface subsystem 116 may be implemented using a touch pad, a touch screen, mechanical buttons, and the like. Interface 116 allows the user to select options for generating a photocopy 128 from a user-provided document 126. For example, interface 116 may allow the user to select the paper size to be used for generating the photocopy, the copy darkness, the copy contrast, number of copies to be produced, magnification/reduction ratio, and other like options known to those skilled in the art. Interface 116 may also provide a "Copy/Start" key that allows the user to initiate the copying function. Upon selection of the "Start/Copy" key, copier 102 prints a copy 128 (or photocopy) of the user-provided document 126.

According to an embodiment of the present invention, interface 116 allows a user to select if an identification tag is to be physically associated with photocopy paper document 128 generated by copier 102. For example, before photocopying a user-provided document 126, interface 116 may prompt the user to select whether an identification tag is to be physically associated with the photocopy. An identification tag is then physically associated with the photocopy paper document only if the user indicates that an identification tag is to be physically associated with the photocopy.

In an alternative embodiment of the present invention, an identification tag may be physically associated with a photocopy generated by copier 102 without prompting the user or without receiving the user's permission. In this embodiment of the present invention, activation of the "Copy/Start" key by the user is sufficient to initiate the photocopying function, cause copier 102 to physically associate an identification tag to the generated photocopy paper document, read the identification code information from the identification tag physically associated with the photocopy generated by copier 102, and store the identification code information, and physical location information of document 128 in a paper document tracking database. As indicated above, the physical location of photocopy document 128 may be initialized to the physical location of copier 102. Other information related to the photocopy may also be stored in the paper document tracking database.

According to an embodiment of the present invention, selection of the "Copy/Start" key represents a single user command that is interpreted by copier 102 to request both copying, physically associating an identification tag with the generated photocopy, and storing information in the paper document tracking database. In this embodiment, the user may not be aware that an identification tag has been applied to the photocopy produced by copier 102 and that the identification code read from the identification tag and corresponding physical location information of the generated photocopy has been automatically archived by copier 102 in the paper document tracking database.

User interface subsystem 116 also serves as an interface for outputting information to the user. For example, information related to the status of copier 102 or information related to the copying function initiated by a user might be output to the user via interface 116.

Network interface subsystem 118 provides an interface to other computer systems (e.g., data processing system 108), networks, and devices. Embodiments of network interface subsystem 118 include an Ethernet card, a modem (telephone, satellite, cable, ISDN, etc.), (asynchronous) digital subscriber line (DSL) units, and the like. Network interface system 118 facilitates transfer of information to and from copier 102 in an appropriate format.

Processor 110 performs or controls the overall functioning of copier 102. For example, processor 110 may execute a program that controls the functions of the various subsystems of copier 102. These functions may include physically associating identification tags with photocopies, reading identification code information from the identification tags physically associated with photocopies generated by copier 102, and storing identification code information and corresponding physical location information in the paper document tracking database.

Storage subsystem 114 may be configured to store the basic programming and data constructs that provide the functionality of copier 102. For example, according to an embodiment of the present invention, software modules and control programs implementing the functionality of copier 102 may be stored in storage subsystem 114. Processor 110 may execute these software modules. Storage subsystem 114 may also provide a repository or database for storing information according to the teachings of the present invention. For example, the paper document tracking database may be stored in storage subsystem 114. It should be understood that the paper document tracking database may be stored locally (i.e., by copier 102) or by some other storage system. For example, according to an embodiment of the present invention, the paper document tracking database may be stored by data processing system 108. In this embodiment, copier 102 may be configured to communicate the identification code information and physical location information to data processing system 108.

Scanner subsystem 120 includes a scanner 130 and an image-processing unit 132. Scanner 130 is configured to capture an image of user-provided document 126 and transmit the image to image processing unit 132. Image processing unit 132 operates to remove distortion inherent in the scanning process. The output of the image-processing unit is a scanned image of document 126 with the distortion removed. The scanned image is then forwarded to print subsystem 122 for further processing via video bus 134. The scanned image is used to generate a photocopy 128 of user-provided document 126. According to an embodiment of the present invention, the scanned image is also stored in the paper document tracking database and associated with identification code read from the identification tag physically associated with document 128.

According to an embodiment of the present invention, an image data tap 136 provides processor 110 with access to scanned image data transferred over video bus 134. In alternative embodiments of the present invention, the image scanned by scanner 130 may be provided to processor 110 by scanner subsystem 120.

Print subsystem 122 operates in accordance with well-known laser xerography principles and is configured to receive scanned information from scanner subsystem 120 and produce a paper document photocopy 128 of user-provided document 126. Print engine 122 operates in synchrony with tag subsystem 124 to ensure that an identification tag is appropriately physically associated with photocopy 128 and that identification code information from the identification tag is read and stored in the paper document tracking database along with physical location information for the photocopy.

Tag subsystem 124 is configured to physically associate identification tags with photocopies generated by copier 102. As described above, various different techniques may be used to physically associate an identification tag with a photocopy paper document. For example, the paper document photocopy 128 may be generated using at least one tagged paper. An identification tag may also be attached to photocopy 128 or embodied in an object attached to photocopy 128.

According to an embodiment of the present invention, Hitachi Mu-chips are used as an identification tag. Due to its reduced size, various different ways may be used for physically associating a Mu chip with photocopy 128. If the chip is embedded in paper (i.e., if tagged paper is used), tag subsystem 124 may select at least one tagged paper sheet and provide the tagged paper to print subsystem 122 to generate photocopy paper document 128. According to an embodiment of the present invention, tag subsystem 124 in conjunction with print subsystem 122 ensures that at least one tagged page is used to generate photocopy 128. If the photocopy consists of multiple pages, then normal paper pages (i.e., paper pages without the embedded identification tag) may be used for other pages of the photocopy paper document. The selection of one or more tagged papers for generating photocopy 128 may be performed by tag subsystem 124, by print subsystem 122, or by the two in conjunction.

An identification tag may also be physically associated with a paper document by physically applying or attaching the identification tag to the paper document. If the size of the identification tag permits, the identification tag may be attached to paper document photocopy 128 such that it is not directly visible to the unaided observer or user of paper document 128. For example, the identification tag may be embedded or mounted on a staple, and copier 102 may attach the staple to photocopy document 128. The identification tag may also be attached to photocopy paper document 128 by mixing it in the ink that is printed on one or more pages of the photocopy when the photocopy is generated by print subsystem 122. The identification tag may also be physically associated with the photocopy paper document generated by copier 102 using an adhesive, a clip, or other like mechanism.

In alternative embodiments, copier 102 may dispense a sticker or label comprising an identification tag. The identification tag may be physically associated with photocopy 128 by applying the sticker or label to photocopy document 128. For example, copier 102 may dispense a label comprising an identification tag and a user may be requested to apply the dispensed label to photocopy 128 generated by copier 102. Various other techniques may also be used to physically associate an identification tag with paper document 128.

As previously described, each identification tag stores information such as a unique identification code that can be used to uniquely identify a paper document. The identification code may be programmed into the identification tag when the identification tag is manufactured or activated. In alternative embodiments of the present invention, copier 102 may be configured to write a unique identification code in the memory of an identification tag during the generation of photocopy 128. For example, the identification code information may be stored in the memory of an identification tag before the tag is physically associated with photocopy 128.

According to an embodiment of the present invention, tag subsystem 124 is also configured to read the identification code from an identification tag that is physically associated with a photocopy paper document 128 generated by copier 102. In order to facilitate reading of the identification code from the identification tag, one or more tag readers 138 may be incorporated into tag subsystem 124. The tag readers are configured to read information from each identification tag physically associated with paper documents generated by copier 102. The type of tag reader used generally depends on the type of identification tags used by copier 102. For example, if a Hitachi Mu-chip is used as an identification tag, tag reader 138 included in tag subsystem 124 may be constructed to expose the Mu-chip to 2.45 GHz band of microwaves and to detect and read radio waves emanating from the Mu-chip. Various other types of tag readers that are capable of detecting electromagnetic, optical, acoustical, or other signals may be used in alternative embodiments of the present invention using other forms of identification tags.

Upon reading identification code information from an identification tag that is physically associated with a paper document generated by copier 102, the identification code information and the corresponding physical location information of the paper document is stored. Since the physical location of copy 128 when it is generated is the same as the physical location of copier 102, the physical location information is initialized to the physical location of copier 102. As indicated above, the identification code read from the identification tag physically associated with the generated photocopy and the physical location information for the corresponding paper document may be stored in a paper document tracking database.

In alternative embodiments of the present invention, other information related to the paper document might also be stored in the paper document tracking database along with the identification code information and the physical location information. For example, according to an embodiment of the present invention, the scanned image of document 126 (scanned by scanner subsystem 120) is also stored in the paper document tracking database and associated with the identification code information read from the identification tag that is physically associated with photocopy 128 generated by copier 102 for user-provided document 126. Other types of information related to the photocopy document might also be stored in the paper document tracking database.

Careful synchronization between the various subsystems of copier 102 is needed to ensure proper functioning of copier 102 according to the teachings of the present invention. Various synchronization signals known to those skilled in the art may be used to achieve this synchronization. Many other configurations of copier 102 are possible having more or fewer components than the system depicted in FIG. 1.

As described above, for each photocopy document generated by copier 102, an identification tag storing a unique identification code is physically associated with the photocopy document. Identification code information that is read from the identification tag physically associated with the photocopy and information identifying the physical location of the generated photocopy is stored in the paper document tracking database. In the manner described above, other paper document output devices may also be configured to generate paper documents according to the teachings of the present invention.

Figure 2:
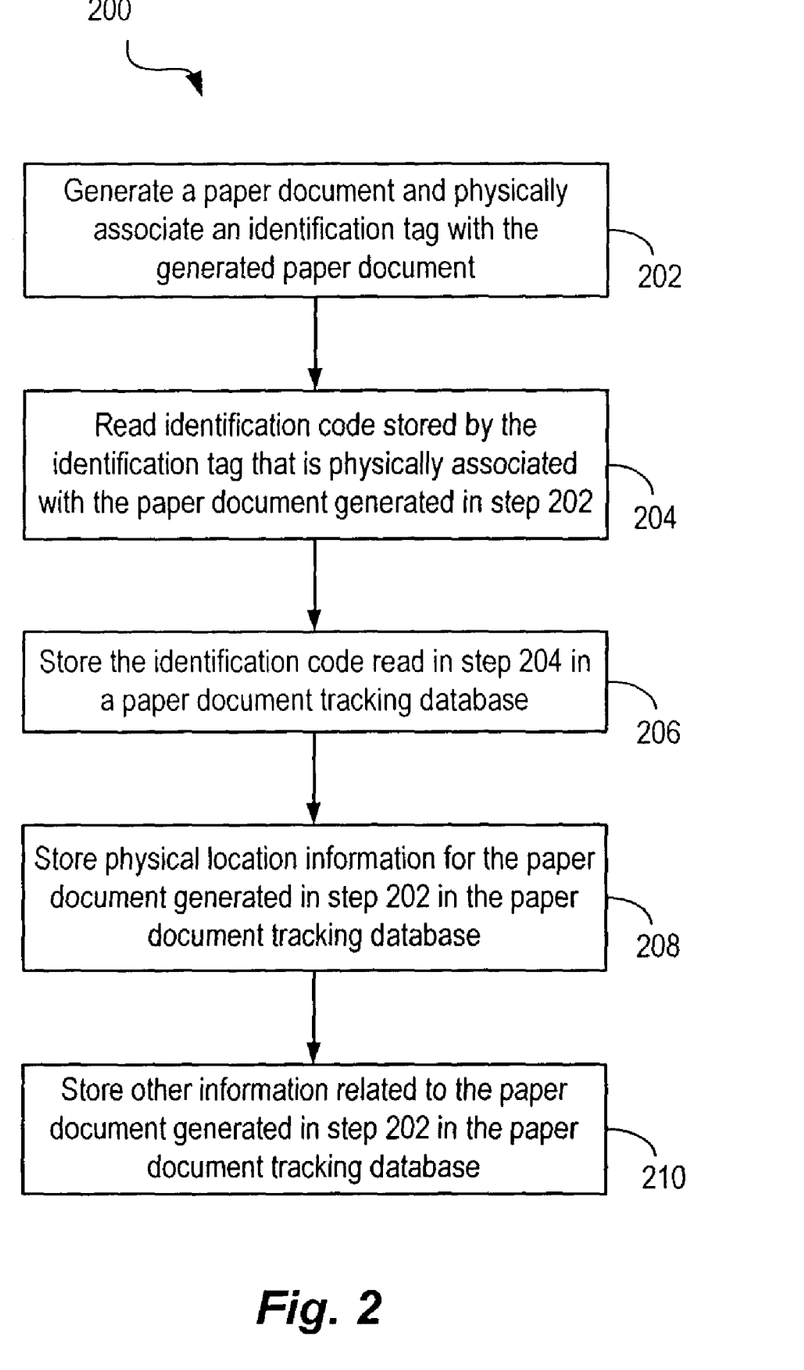
FIG. 2 is a simplified high-level flowchart depicting a method of generating a paper document according to an embodiment of the present invention.

FIG. 2 is a simplified high-level flowchart 200 depicting a method of generating a paper document according to an embodiment of the present invention. A paper document output device may perform the method. Flowchart 200 depicted in FIG. 2 is merely illustrative of an embodiment incorporating the present invention and does not limit the scope of the invention as recited in the claims. One of ordinary skill in the art would recognize variations, modifications, and alternatives.

As depicted in FIG. 2, a paper document output device generates a paper document and an identification tag is physically associated with the generated paper document (step 202). As described above, according to an embodiment of the present invention, the identification tag may be automatically (e.g., by using tagged paper, a staple with the identification tag embedded in it, ink containing the identification tag, etc.) physically associated with the paper document. In alternative embodiments, the paper document output device may dispense an identification tag (e.g., a label comprising an identification tag) and request a user to physically associate the dispensed identification tag with the paper document generated by the paper document output device.

The identification code stored by the identification tag that is physically associated with the paper document generated in step 202 is read by the paper document output device (step 204). As previously described, various different techniques may be used to read identification code information stored by the identification tag that is physically associated with the paper document generated in step 202. The type of technique used for reading information stored by the identification tag generally depends on the type of identification tag used by the paper document output device. The identification code read in step 204 is used to uniquely identify the paper document generated in step 202.

It should be understood that in alternative embodiments of the present invention, the identification code may be read from the identification tag before the identification tag is physically associated with the paper document. In these embodiments, the paper document output device may identify an identification tag to be physically associated with the paper document, read the identification code from the identified identification tag, and then physically associate the identification tag with the paper document.

The identification code read from the identification tag in step 204 is then stored in a paper document tracking database (step 206). The physical location information for the paper document generated in step 204 is also stored in the paper document tracking database (step 208). The physical location information is stored such that it is associated with the identification code information stored in the paper document tracking database in step 206. At the time when the paper document is generated by the paper document output device, the physical location of the paper document is the same as the physical location of the paper document output device. Accordingly, in step 208, the physical location information is initialized to the physical location of the paper document output device.

In specific embodiments of the present invention, other information related to the paper document may also be stored in the paper document tracking database (step 210). For example, electronic information representative of a paper document (e.g., electronic information that is used to generate the paper document) may also be stored in the paper document tracking database along with the identification code identifying the paper document. For example, a scanned image of the paper document, an electronic format (e.g., Postscript format, PDF format) that is received by the paper document output device and used to generate the paper document, etc. may be stored in the paper document tracking database.

Figure 3:
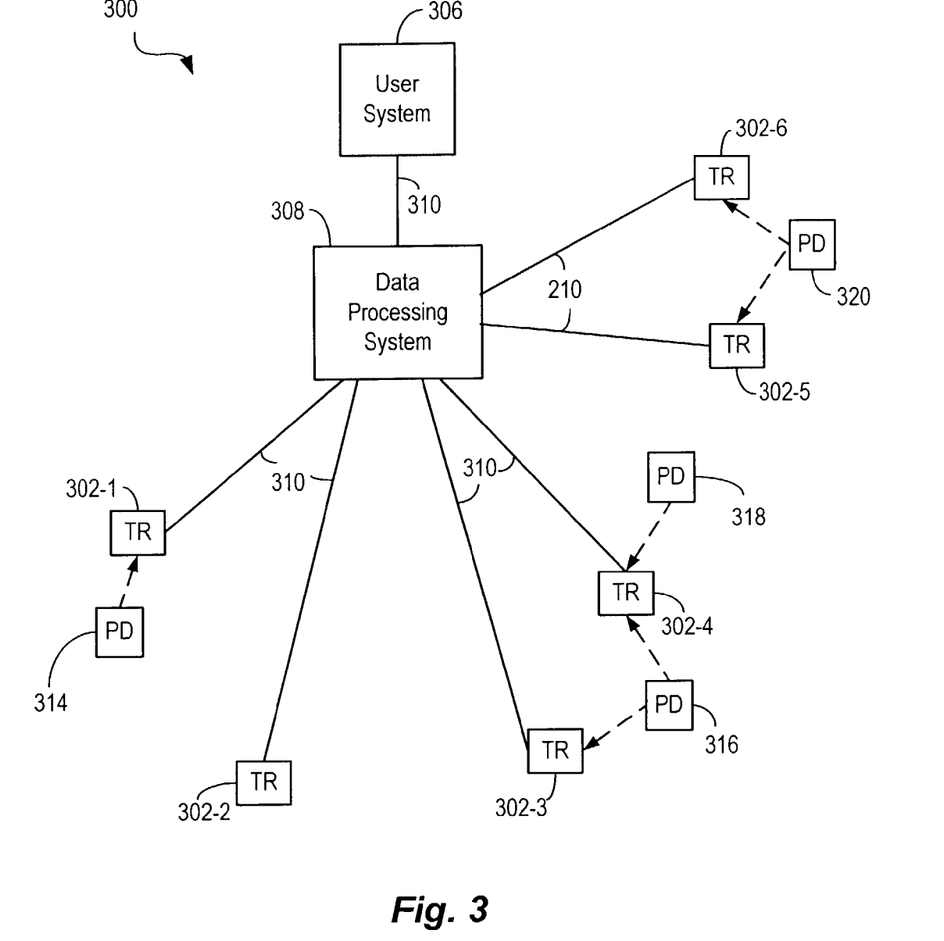
FIG. 3 is a simplified block diagram of a distributed system that may be used to track physical locations of paper documents according to an embodiment of the present invention.

According to the teachings of the present invention, the identification tags associated with the paper documents along with the information stored by the identification tags is used to determine physical locations of paper documents. FIG. 3 is a simplified block diagram of a distributed system 300 that may be used to track physical locations of paper documents according to an embodiment of the present invention. The configuration depicted in FIG. 3 is merely illustrative of an environment incorporating the present invention and does not limit the scope of the invention as recited in the claims. One of ordinary skill in the art would recognize other variations, modifications, and alternatives.

As depicted in FIG. 3, system 300 comprises a plurality of tag readers (TRs) 302, and a user system 306 coupled to a data processing system 308 via communication links 310. Communication links 310 depicted in FIG. 3 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Tag readers 302 are configured to facilitate determination of physical locations of one or more paper documents that have identification tags physically associated (either embedded or attached) with them by reading identification code information stored by the identification tags. Whether or not a particular tag reader 302 can read identification code from an identification tag physically associated with a paper document depends on the proximity of the particular tag reader to the identification tag. Since the identification tag is physically associated with a paper document, whether or not a tag reader 302 can read identification code from an identification tag depends on the proximity of the tag reader to the paper document with which the identification tag is physically associated.

If an identification tag has an on-board power supply (e.g., an on-board battery) and is capable of communicating information (including identification code information) stored in the memory of the identification tag, then a tag reader 302 can detect and read the identification code from the identification tag if the tag reader can detect the information (which could be in various formats) communicated by the identification tag (i.e., the distance from the identification tag to the tag reader is within the communication range of the identification tag and reception range of the tag reader).

If an identification tag does not have its own power supply and depends on a stimulus supplied by an external entity such as a tag reader, then a tag reader is able to read identification code information from the identification tag if the tag reader can expose the identification tag to the requisite stimulus and can read the information transmitted (or radiated) by the identification tag in response to the stimulus. For example, if a Hitachi Mu-chip is used as an identification tag, a tag reader can read the identification code from the Mu-chip if the tag reader is able to expose the Mu-chip to 2.45 GHz band microwaves and is able to read the radio waves that emanate from the irradiated Mu-chip identification tag.

The manner in which a tag reader reads the identification code from an identification tag depends on the type of tag reader and the type of identification tag used. Likewise, a tag reader's ability to detect and read identification code from an identification tag depends on the type of tag reader and the type of identification tag and the proximity of the identification tag to the tag reader. It should be understood that the identification code from a particular identification tag physically associated with a paper document may be detected and read by multiple tag readers that are proximal to the paper document.

For example, in the embodiment depicted in FIG. 3, tag reader 302-1 is able to read the identification code (and other information) from an identification tag physically associated with paper document (PD) 314. Tag readers 302-3 and 302-4 can read the identification code from the identification tag physically associated with paper document 316. Tag reader 302-4 is also able to read the identification code from an identification tag physically associated with paper document 318. Tag readers 302-5 and 302-6 can read the identification code from the identification tag physically associated with paper document 320.

If a particular tag reader is able to read the identification code from an identification tag physically associated with a particular paper document, it indicates that the particular paper document is physically located proximal to the particular tag reader. Accordingly, the physical location of the paper document can be determined from the physical location of the tag reader that is able to read the identification code. If multiple tag readers are able to read an identification code from an identification tag associated with a particular paper document, it indicates that the particular paper document is physically located in a location or zone proximal to the multiple tag readers.

Various different techniques may be used to read information from identification tags using tag readers 302. According to an embodiment of the present invention, a tag reader 302 may be configured to periodically send out a signal to interrogate and read identification code from identification tags that the tag reader can detect and read. In other embodiments, a tag reader 302 may be configured to interrogate identification tags in response to a signal received from an external system, device, or application, or in response to external stimuli. For example, a tag reader may interrogate identification tags upon receiving a signal from data processing system 308.

For each identification code information read by a tag reader 302, the tag reader may associate a timestamp with the identification code information indicating when (e.g., date and time) the tag reader read the identification code information. In addition to the identification code information, a tag reader may also be configured to read other information stored in an identification tag interrogated by the tag reader. The information read by a tag reader from an identification tag may be stored by the tag reader or may be forwarded by the tag reader to a central database or computer system (e.g., data processing system 308) that may store and/or process the information.

According to an embodiment of the present invention, information read by tag readers 302 is communicated to data processing system 308. Based upon the, identification codes received from the individual tag readers and based upon the physical locations of the tag readers, data processing system 308 is able to determine the physical locations of paper documents corresponding to the identification codes received from the tag readers.

Figure 4:
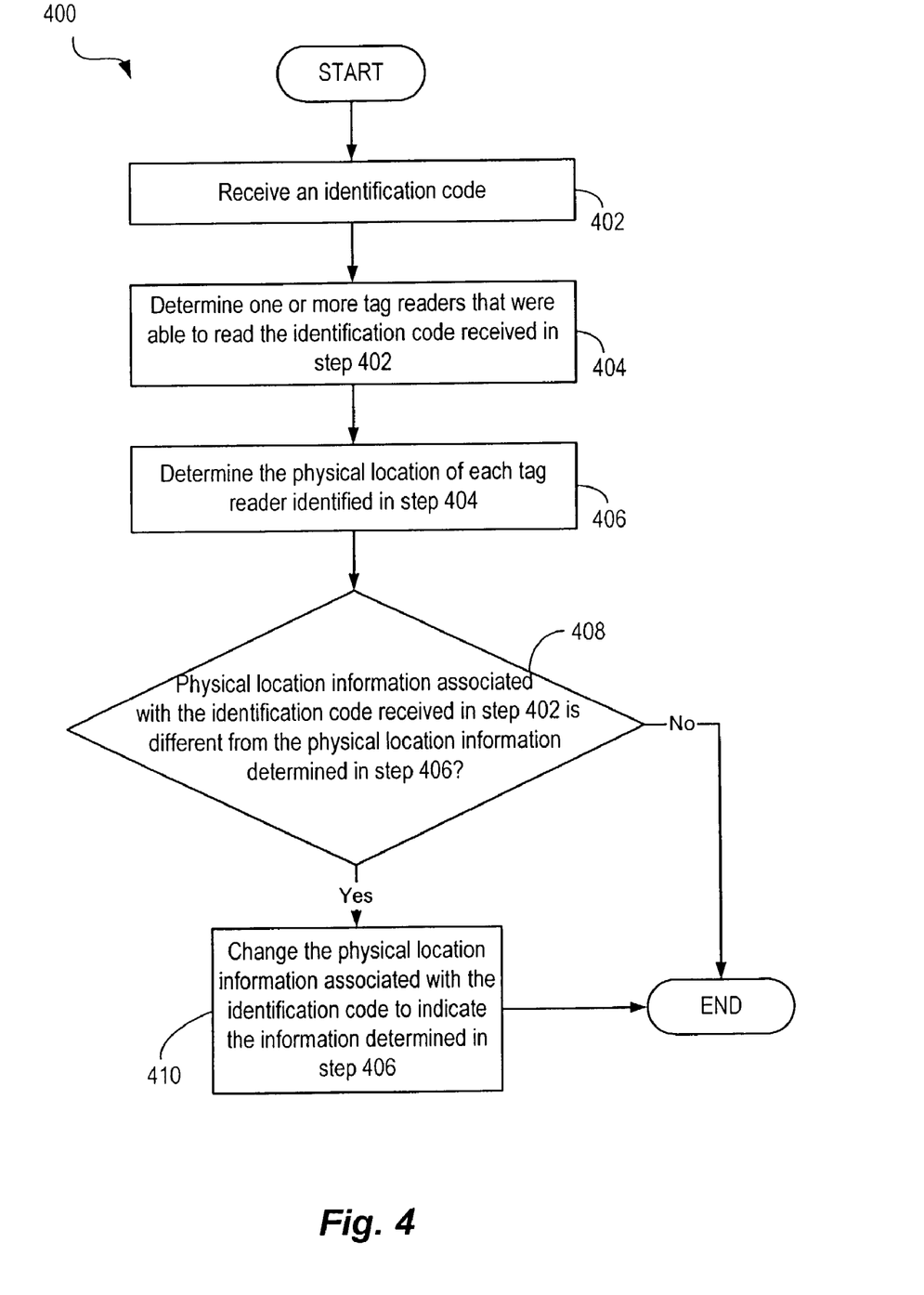
FIG. 4 is a simplified high-level flowchart depicting a method of determining the physical location of a paper document corresponding to an identification code read by a tag reader according to an embodiment of the present invention.

As described above, if a particular tag reader is able to read the identification code from an identification tag physically associated with a particular paper document, it indicates that the particular paper document is physically located proximal to the particular tag reader. The physical location of the paper document can be then determined based on the physical location of the tag reader. FIG. 4 is a simplified high-level flowchart 400 depicting a method of determining the physical location of a paper document corresponding to an identification code read by a tag reader according to an embodiment of the present invention. The method may be performed by data processing system 308. For example, the method may be performed by software modules executed by processor(s) of data processing system 308, or by hardware modules of data processing system 308, or combinations thereof. Flowchart 400 depicted in FIG. 4 is merely illustrative of an embodiment incorporating the present invention and does not limit the scope of the invention as recited in the claims. One of ordinary skill in the art would recognize variations, modifications, and alternatives.

According to an embodiment of the present invention, the processing depicted in FIG. 4 is performed for every identification code read by tag readers 302. The method is initiated when data processing system 308 receives an identification code from one or more tag readers 302 (step 402). As described above, data processing system 308 may periodically receive information regarding identification codes read by tag readers 302. In alternative embodiments, data processing system 308 may receive the information in response to a signal communicated by data processing system 308 to tag readers 302.

Data processing system 308 then determines the one or more tag readers that were able to read the identification code received in step 402 (step 404). As previously described, the identification code may be read by one or more tag readers. For example, as depicted in FIG. 3, an identification code read from an identification tag physically associated with document 316 is read by tag readers 302-3 and 302-4, whereas an identification code read from an identification tag physically associated with document 314 is only read by tag reader 302-1.

Data processing system 308 then determines the physical location of each tag reader identified in step 404 (step 406). According to an embodiment of the present invention, data processing system 308 stores or has access to information that identifies the various tag readers in distributed system 300 and the physical locations of the tag readers. For example, the information may indicate that tag reader 302-1 is located in John's office, tag reader 302-2 is located in John's briefcase, tag readers 302-3 and 302-4 are located in the conference room, tag reader 302-5 is located on Mr. Smith's office desk, tag reader 302-6 is located in Mr. Smith's in-box container in his office, and so on. According to an embodiment of the present invention, information identifying the physical locations of the tag readers is stored in a memory location (e.g., a file) accessible to data processing system 308.

In alternative embodiments, each tag reader 302 may be configured to provide information to data processing system 308 identifying the tag reader's physical location. A tag reader may communicate its physical location information to data processing system 308 along with information related to identification codes read by the tag reader.

Data processing system 308 then determines if the physical location information stored in the paper document tracking database and associated with the identification code received in step 402 is different from the physical location information determined in step 406 (step 408). If the physical location information associated with the identification code and stored in the paper document tracking database is different from the information determined in step 406, it indicates that the physical location of the paper document corresponding to the identification code has changed since the last time that information related to the identification code was stored in the paper document tracking database. In this case, data processing system 308 updates the physical location information associated with the identification code in the paper document tracking database to reflect the information determined in step 406 (step 410). A timestamp value corresponding to when the one or more tag readers read the identification code determined in step 404 might also be stored in the paper document tracking database.

If the physical location information for the identification code in the paper document tracking database is the same as the information determined in step 406, it indicates that the physical location of the paper document corresponding to the identification code has not changed since the last time that information related to the identification code was stored in the paper document tracking database. In this case, the physical location stored in the paper document tracking database corresponding to the identification code need not be changed. A timestamp value corresponding to when the one or more tag readers read the identification code determined in step 404 might be stored in the paper document tracking database.

In alternative embodiments of the present invention, if it is determined in step 408 that the physical location of the document has changed, instead of overwriting the previous physical location information associated with the identification code identifying the document per step 410, information identifying the new physical location of the document determined in step 406 may be appended to the physical location information associated with the identification code information. In this embodiment, for each identification code, the physical location information associated with an identification code comprises information identifying the various physical locations of the paper document over time. The physical tracking information associated with the identification code thus represents a log of the various physical locations where the paper document was detected. Each physical location entry in the log may be time stamped indicating when the document was detected to be in that location.

In the manner described above, the information stored in the paper document tracking database is continuously updated to reflect the latest physical location of a paper document that has an identification tag physically associated with it. A user may then query the paper document tracking database to determine the physical location of any specific paper document identified by an identification code. A user may also query the paper document tracking database to determine a log of the various physical locations where the paper document has been located.

According to an embodiment of the present invention, a user may use user system 306 depicted in FIG. 3 to query information stored in the paper document tracking database. A user interface may be provided on user system 306 that enables the user to configure a query to determine physical locations of one or more user-specified documents and to output results of the query. The documents may be specified using identification codes associated with the documents, or using other techniques. User system 306 may be a personal computer, a portable computer, a workstation, a computer terminal, a network computer, a kiosk, a personal digital assistant (PDA), a communication device such as a cell phone, or any other data processing system.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of storing information that enables tracking of physical locations of paper documents, the method comprising:
   receiving a signal to generate a paper document;
   generating the paper document using a paper document output device, wherein an identification tag is physically associated with the paper document;
   determining identification information stored by the identification tag, wherein the identification information determined from the identification tag is used to identify the paper document;
   storing the identification information; and
   storing physical location information identifying a physical location of the paper document such that the physical location information is associated with the stored identification information, wherein the physical location information is set to a physical location of the paper document output device.

2. The method of claim 1 wherein:
   the identification tag is embedded in a first paper page; and
   generating the paper document comprises using the first paper page to generate the paper document.

3. The method of claim 1 wherein:
   the identification tag is embedded in a staple; and
   generating the paper document comprises applying the staple to the paper document.

4. The method of claim 1 wherein generating the paper document comprises:
   generating a label comprising the identification tag; and
   applying the label to the paper document.

5. The method of claim 1 wherein generating the paper document comprises attaching the identification tag to the paper document.

6. The method of claim 1 wherein:
   the paper document output device is a copier; and
   generating the paper document comprises:
      scanning a user-provided paper document to generate a scanned image representative of the user-provided paper document; and
      generating the paper document based upon the scanned image.

7. The method of claim 6 further comprising:
   storing the scanned image such that the scanned image is associated with the stored identification information.

8. The method of claim 1 wherein:
   the paper document output device is a printer; and
   generating the paper document comprises:
      receiving electronic information representing the paper document; and
      printing the paper document based upon the electronic information.

9. The method of claim 8 further comprising:
   storing the electronic information such that the electronic information is associated with the stored identification information.

10. The method of claim 8 wherein the electronic information is selected from a group consisting of Postscript format, Portable Document Format (PDF), and image format.

11. The method of claim 1 wherein:
    the paper document output device is a facsimile machine; and
    generating the paper document comprises:
       receiving electronic facsimile information representing the paper document; and
       printing the paper document based upon the electronic facsimile information.

12. The method of claim 11 further comprising:
    storing the electronic facsimile information such, that the electronic facsimile information is associated with the stored identification information.

13. The method of claim 1 wherein determining the identification information stored by the identification tag comprises:
    reading the identification information from the identification tag using one or more tag readers.

14. A paper document output device comprising:
    a memory;
    a print subsystem; and
    a tag subsystem;
    wherein the print subsystem is configured to generate a paper document in response to a signal received by the paper document output device, wherein an identification tag is physically associated with the paper document;
    wherein the tag subsystem is configured to determine identification information stored by the identification tag, wherein the identification information determined from the identification tag is used to identify the paper document; and
    wherein the memory is configured to store the identification information and physical location information identifying a physical location of the paper document, such that the physical location information is associated with the stored identification information, wherein the physical location information is set to a physical location of the paper document output device.

15. The paper document output device of claim 14 wherein:
    the identification tag is embedded in a first paper page; and
    the print subsystem is configured to generate the paper document using the first paper page to generate the paper document.

16. The paper document output device of claim 14 wherein:
    the identification tag is embedded in a staple; and
    the print subsystem is configured to apply the staple to the paper document.

17. The paper document output device of claim 14 wherein the print subsystem is configured to generate a label comprising the identification tag.

18. The paper document output device of claim 14 wherein the tag subsystem is configured to attach the identification tag to the paper document.

19. The paper document output device of claim 14 further comprising:
    a scanner subsystem configured to scan a user-provided paper document to generate a scanned image representative of the user-provided paper document; and
    wherein the print subsystem is configured to generate the paper document based upon the scanned image.

20. The paper document output device of claim 19 wherein the scanned image is stored such that the scanned image is associated with the stored identification information.

21. The paper document output device of claim 14 wherein the print subsystem is configured to print the paper document based upon electronic information representing the paper document received by the paper document output device.

22. The paper document output device of claim 21 wherein the electronic information is stored such that the electronic information is associated with the stored identification information.

23. The paper document output device of claim 21 wherein the electronic information is selected from a group consisting of Postscript format, Portable Document Format (PDF), and image format.

24. The paper document output device of claim 14 wherein the print subsystem is configured to print the paper document based upon electronic facsimile information representing the paper document received by the paper document output device.

25. The paper document output device of claim 24 wherein the electronic facsimile information is stored such that the electronic facsimile information is associated with the stored identification information.

26. The paper document output device of claim 14 wherein the tag subsystem is configured to determine the identification information stored by the identification tag by reading the identification information from the identification tag using one or more tag readers.

27. A computer-readable storage medium storing a computer program, the computer program comprising:
   code for receiving a signal to generate a paper document;
   code for generating the paper document using a paper document output device, wherein an identification tag is physically associated with the paper document;
   code for determining identification information stored by the identification tag, wherein the identification information determined from the identification tag is used to identify the paper document;
   code for storing the identification information; and
   code for storing physical location information identifying a physical location of the paper document such that the physical location information is associated with the stored identification information, wherein the physical location information is set to a physical location of the paper document output device.

28. The computer-readable storage medium of claim 27 wherein:
   the identification tag is embedded in a first paper page; and
   the code for generating the paper document comprises code for using the first paper page to generate the paper document.

29. The computer-readable storage medium of claim 27 wherein:
   the identification tag is embedded in a staple; and
   the code for generating the paper document comprises code for applying the staple to the paper document.

30. The computer-readable storage medium of claim 27 wherein the code for generating the paper document comprises:
   code for generating a label comprising the identification tag; and
   code for applying the label to the paper document.

31. The computer-readable storage medium of claim 27 wherein the code for generating the paper document comprises code for attaching the identification tag to the paper document.

32. The computer-readable storage medium of claim 27 wherein:
   the paper document output device is a copier; and
   the code for generating the paper document comprises:
      code for scanning a user-provided paper document to generate a scanned image representative of the user-provided paper document; and
      code for generating the paper document based upon the scanned image.

33. The computer-readable storage medium of claim 32 further comprising:
   code for storing the scanned image such that the scanned image is associated with the stored identification information.

34. The computer-readable storage medium of claim 27 wherein:
   the paper document output device is a printer; and
   the code for generating the paper document comprises:
      code for receiving electronic information representing the paper document; and
      code for printing the paper document based upon the electronic information.

35. The computer-readable storage medium of claim 34 further comprising:
   code for storing the electronic information such that the electronic information is associated with the stored identification information.

36. The computer-readable storage medium of claim 34 wherein the electronic information is selected from a group consisting of Postscript format, Portable Document Format (PDF), and image format.

37. The computer-readable storage medium of claim 27 wherein:
   the paper document output device is a facsimile machine; and
   the code for generating the paper document comprises:
      code for receiving electronic facsimile information representing the paper document; and
      code for printing the paper document based upon the electronic facsimile information.

38. The computer-readable storage medium of claim 37 further comprising:
   code for storing the electronic facsimile information such that the electronic facsimile information is associated with the stored identification information.

39. The computer-readable storage medium of claim 27 wherein the code for determining the identification information stored by the identification tag comprises:
   code for reading the identification information from the identification tag using one or more tag readers.

40. The computer-readable storage medium of claim 37 wherein the code for determining the physical location of the first tag reader comprises:
   code for receiving information from the first tag reader identifying the physical location of the first tag reader.

41. A paper document output device comprising:
   means for receiving a signal to generate a paper document;
   means for generating the paper document, wherein an identification tag is physically associated with the paper document;
   means for determining identification information stored by the identification tag, wherein the identification information determined from the identification tag is used to identify the paper document;
   means for storing the identification information; and
   means for storing physical location information identifying a physical location of the paper document such that the physical location information is associated with the stored identification information, wherein the physical location information is set to a physical location of the paper document output device.

42. A method for determining physical locations of paper documents, the method comprising:
   sending a signal to a set of tag readers to determine a physical location of a paper document;
   receiving first information from a first tag reader from the set of tag readers, the first information including identification information read by the first tag reader from an identification tag physically associated with the paper document;

determining a physical location of the first tag reader; and storing physical location information of the first tag reader such that the physical location of the first tag reader is associated with the identification information.

43. The method of claim 42 wherein determined the physical location of the first tag reader comprises:

receiving information from the first tag reader identifying the physical location of the first tag reader.

44. The method of claim 42 wherein determining the physical location of the first tag reader comprises:

determining the physical location of the first tag reader from a database storing information identifying a plurality of tag readers and information identifying physical locations of the plurality of tag readers, the plurality of tag readers including the first tag reader.

45. The method of claim 42 wherein storing the physical location information of the first tag reader comprises:

changing physical location information associated with the identification information to indicate the physical location of the first tag reader.

46. The method of claim 42 wherein storing the physical location information of the first tag reader comprises:

appending information identifying the physical location of the first tag reader to physical location information associated with the identification information.

47. The method of claim 42 further comprising:

receiving a query identifying the paper document and requesting information identifying the physical location of the paper document; and responsive to receiving the query:

determining the physical location information associated with the identification information identifying the paper document; and outputting the physical location information.

48. A system for determining physical locations of paper documents, the system comprising:

a memory;

a signal transmitting subsystem; and a data processing subsystem;

wherein the signal transmitting subsystem is configured to send a signal to a set of tag readers to determine a physical location of a paper document;

wherein the data processing subsystem is configured to:

receive first information from a first tag reader from the set of tag readers, the first information including identification information read by the first tag reader from an identification tag physically associated with the paper document; and determine a physical location of the first tag reader; and wherein the memory is configured to store physical location information of the first tag reader such that the physical location of the first tag reader is associated with the identification information.

49. The system of claim 48 wherein the data processing subsystem is configured to receive information from the first tag reader identifying the physical location of the first tag reader.

50. The system of claim 48 wherein the data processing subsystem is configured to determine the physical location of the first tag reader from a database storing information identifying a plurality of tag readers and information identifying physical locations of the plurality of tag readers, the plurality of tag readers including the first tag reader.

51. The system of claim 48 wherein the data processing subsystem is configured to change the physical location information associated with the identification information to indicate the physical location of the first tag reader.

52. The system of claim 48 wherein the data processing subsystem is configured to append information identifying the physical location of the first tag reader to the physical location information associated with the identification information.

53. The system of claim 48 wherein the data processing subsystem is further configured to:

receive a query identifying the paper document and request information identifying the physical location of the paper document;

determine the physical location information associated with the identification information identifying the paper document; and output the physical location information.

54. A computer-readable storage medium storing a computer program, the computer program comprising:

code for sending a signal to a set of tag readers to determine a physical location of a paper document;

code for receiving first information from a first tag reader from the set of tag readers, the first information including identification information read by the first tag reader from an identification tag physically associated with the paper document;

code for determining a physical location of the first tag reader; and code for storing physical location of the first tag reader such that the physical location of the first tag reader is associated with the identification information.

55. The computer-readable storage medium of claim 54 wherein the code for determining the physical location of the first tag reader comprises:

code for determining the physical location of the first tag reader from a database storing information identifying a plurality of tag readers and information identifying physical locations of the plurality of tag readers, the plurality of tag readers including the first tag reader.

56. The computer-readable storage medium of claim 54 wherein the code for storing the physical location information of the first tag reader comprises:

code for changing the physical location information associated with the identification information to indicate the physical location of the first tag reader.

57. The computer-readable storage medium of claim 54 wherein the code for storing the physical location information of the first tag reader comprises:

code for appending information identifying the physical location of the first tag reader to the physical location information associated with the identification information.

58. The computer-readable storage medium of claim 54 further comprising:

code for receiving a query identifying the paper document and requesting information identifying the physical location of the paper document; and responsive to receiving the query:

code for determining the physical location information associated with the identification information identifying the paper document; and code for outputting the physical location information.

* * * * *

UNITED STATES PATENT AND TRADEMARK OFFICE
CERTIFICATE OF CORRECTION

PATENT NO. : 7,424,974 B2 Page 1 of 1
APPLICATION NO. : 10/235035
DATED : September 16, 2008
INVENTOR(S) : Jonathan J. Hull et al.

It is certified that error appears in the above-identified patent and that said Letters Patent is hereby corrected as shown below:

Column 18, line 4, "such," should be changed to -- such --

Column 21, line 8, "determined" should be changed to -- determining --

Signed and Sealed this

Sixth Day of January, 2009

JON W. DUDAS
*Director of the United States Patent and Trademark Office*